United States Patent
Suzuki et al.

(10) Patent No.: US 9,678,845 B2
(45) Date of Patent: Jun. 13, 2017

(54) ABNORMALITY DIAGNOSTIC SYSTEM AND INDUSTRIAL MACHINERY

(75) Inventors: Hideaki Suzuki, Hitachi (JP); Kozo Nakamura, Hitachiota (JP); Shinya Yuda, Hitachi (JP); Hiroki Uchiyama, Kawasaki (JP)

(73) Assignee: HITACHI, LTD., Tokyo (JP)

( * ) Notice: Subject to any disclaimer, the term of this patent is extended or adjusted under 35 U.S.C. 154(b) by 1057 days.

(21) Appl. No.: 13/881,543

(22) PCT Filed: Oct. 20, 2011

(86) PCT No.: PCT/JP2011/074218
§ 371 (c)(1),
(2), (4) Date: Apr. 25, 2013

(87) PCT Pub. No.: WO2012/057001
PCT Pub. Date: May 3, 2012

(65) Prior Publication Data
US 2013/0218522 A1   Aug. 22, 2013

(30) Foreign Application Priority Data
Oct. 28, 2010  (JP) ................................. 2010-242180

(51) Int. Cl.
*G01F 19/00* (2006.01)
*G06F 11/30* (2006.01)
(Continued)

(52) U.S. Cl.
CPC .......... *G06F 11/30* (2013.01); *G05B 23/0208* (2013.01); *G05B 23/0237* (2013.01);
(Continued)

(58) Field of Classification Search
USPC .................................. 701/29.1; 702/67, 182
See application file for complete search history.

(56) References Cited

U.S. PATENT DOCUMENTS

| | | | | |
|---|---|---|---|---|
| 4,258,421 A | * | 3/1981 | Juhasz | G07C 5/085 |
| | | | | 340/870.16 |
| 6,587,812 B1 | * | 7/2003 | Takayama | B30B 15/14 |
| | | | | 702/182 |
| 2010/0070130 A1 | * | 3/2010 | Suzuki | E02F 9/2054 |
| | | | | 701/33.4 |

FOREIGN PATENT DOCUMENTS

| | | |
|---|---|---|
| JP | 2002-6942 | 1/2002 |
| JP | 2003-15734 | 1/2003 |

(Continued)

*Primary Examiner* — Lam Nguyen
(74) *Attorney, Agent, or Firm* — Baker Botts L.L.P.

(57) ABSTRACT

An object of the present invention is to provide an abnormality diagnostic system that can enhance diagnostic precision even if a computer arranged on the machine side does not have sufficient throughput in diagnosing a condition of a machine or equipment based upon time series data generated by a sensor and can reduce communication capacity because communication data volume decreases and industrial machinery provided with the abnormality diagnostic system. A diagnostic device on the machine side 2 diagnoses time series data generated by a sensor, acquires a primary diagnostic result, extracts time series data related to the primary diagnostic result and outputs it to a diagnostic device on the server side 3 together with the primary diagnostic result, the diagnostic device on the server side 3 diagnoses the time series data, acquires a secondary diagnostic result, and displays the secondary diagnostic result together with the primary diagnostic result. Besides, the diagnostic device on the server side compares the diagnostic results and updates a diagnostic process of the diagnostic device on the machine side 2 when the diagnostic results are different as a result of the comparison.

10 Claims, 11 Drawing Sheets

(51) Int. Cl.
*G05B 23/02* (2006.01)
*G07C 3/00* (2006.01)

(52) U.S. Cl.
CPC ...... *G05B 23/0272* (2013.01); *G05B 23/0221* (2013.01); *G05B 23/0264* (2013.01); *G07C 3/00* (2013.01)

(56) References Cited

FOREIGN PATENT DOCUMENTS

| | | |
|---|---|---|
| JP | 2005-43138 | 2/2005 |
| JP | 2008-176404 | 7/2008 |
| JP | 2009-200208 | 9/2009 |

\* cited by examiner

| t0 | v0 |
|----|----|
| t1 | v1 |
| t2 | v2 |
| t3 | v3 |
| ⋮ | ⋮ |
| tN | vN |

ABNORMALITY DIAGNOSTIC SYSTEM AND INDUSTRIAL MACHINERY

TECHNICAL FIELD

The present invention relates to an abnormality diagnostic system which is attached to a machine or equipment and which diagnoses a condition of the machine or the equipment and industrial machinery provided with the abnormality diagnostic system.

BACKGROUND ART

The continuous operation of 365 days without stopping approximately for 24 hours a day is required for some industrial machines. For such industrial machines, a machine such as a large hydraulic shovel operated in a mine and others and a plant can be given. As such an industrial machine (hereinafter suitably called a machine merely) has a great effect when it stops because of failure and others, measures such as making the machine or various equipment which is a part (a component) of the machine an optimum state by maintenance so as to prevent the machine from stopping because of failure are taken.

As for maintenance, scheduled maintenance based upon time (time reference maintenance) is general, however, recently, condition reference maintenance in which maintenance is executed according to a condition of a machine or equipment attracts attention. In the scheduled maintenance, a schedule according to which a check and maintenance are made based upon elapsed time or operation hours of a machine or equipment and others is determined. In the meantime, in the condition reference maintenance, information acquired based upon data measured by a sensor and others is processed in a computer, a condition of the machine or the equipment is grasped depending upon whether the current value reaches a predetermined reference value or not, and a schedule of a check and maintenance is determined based upon the grasped condition. The detection of the abnormality of equipment related to maintenance is executed by a controller and others provided on the machine side and the controller gives an alarm in the failure of the machine or the equipment or immediately before it.

In the condition reference maintenance, a check and a maintenance work are more efficient, compared with the time reference maintenance. However, the efficiency of maintenance work is influenced by the performance of a diagnostic process based upon measured data and especially, the setting of a reference value for the diagnostic process is difficult. Then, to enhance diagnostic performance, there is movement that algorithm for performing higher diagnostic determination is to be utilized.

Besides, patent literatures 1 to 3 disclose diagnostic systems of equipment. The patent literature 1 discloses technique for detecting an abnormal condition of equipment and varying the compressibility of transferred data according to it. The patent literature 2 discloses technique for updating reference data of a diagnostic system. The patent literature 3 discloses technique for updating a diagnostic model required for diagnosis for a diagnostic system built in a machine.

CITATION LIST

Patent Literature

[Patent Literature 1] Japanese Unexamined Patent Application Publication No. 2003-15734
[Patent Literature 2] Japanese Unexamined Patent Application Publication No. 2009-200208
[Patent Literature 3] Japanese Unexamined Patent Application Publication No. 2005-43138

SUMMARY OF INVENTION

Technical Problem

It is difficult to mount complex diagnostic algorithm in a computer such as a controller arranged on the machine side because of constraints on resources such as CPU and a memory. In the meantime, in simple diagnostic algorithm such as the determination of a threshold, a false report is caused because equipment is used on an operating condition actually different from it in design and others. To make more accurate diagnosis, complex algorithm is required to be executed, however, this can be executed only in a computer having spare resources in CPU and a memory of a server and others arranged in operation and maintenance facilities, and therefore, sense data is required to be directly transmitted from a controller arranged on the machine side to the server via a network and others. However, as the capacity of communication and storage and the cost have a problem to directly transmit all sense data from the controller on the machine side to the server, some measure is required to be taken.

In the patent literature 1, an abnormal condition of the equipment is detected and the compressibility of transferred data is varied according to it. However, as the compressibility of data varies depending upon the performance of diagnosis even if the technique is used, data volume may be unable to be fully reduced in poor diagnosis in precision executed in a computer such as a controller arranged on the machine side.

In the patent literature 2, the reference data of the diagnostic system is updated, however, as the update of the reference data is based upon a result of quality inspection, the technique has a problem that automation is difficult.

In the patent literature 3, the diagnostic model required for diagnosis is updated for the diagnostic system built on the machine side. However, in the cited document 3, a method of modifying the diagnostic model and a method of acquiring the information of an error in diagnosis required for the modification are not disclosed.

The present invention is made in view of such problems and its object is to provide an abnormality diagnostic system and industrial machinery provided with the abnormality diagnostic system where diagnostic precision can be enhanced, communication data volume decreases and communication capacity can be reduced even if a computer arranged on the machine side does not have sufficient throughput in diagnosing a condition of a machine or equipment based upon time series data generated by a sensor attached to the machine or the equipment.

Solution to Problem

To settle the above-mentioned problems, the present invention is based upon an abnormality diagnostic system that diagnoses a condition of a machine or equipment based upon time series data generated by a sensor attached to the machine or the equipment, and has a characteristic that a first diagnostic device built in a computer on the machine side and a second diagnostic device built in a server that communicates with the first diagnostic device are provided, the first diagnostic device diagnoses the time series data generated by the sensor and acquires a first diagnostic result, the first diagnostic device extracts time series data related to the first diagnostic result according to the first diagnostic result and outputs the time series data related to the first diagnostic result together with the first diagnostic result, the second diagnostic device receives the first diagnostic result and the time series data related to the first diagnostic result from the first diagnostic device, the second diagnostic device diagnoses the time series data, acquires a second diagnostic result and outputs the second diagnostic result together with the first diagnostic result.

Diagnostic precision can be enhanced by configuring the abnormality diagnostic system by the first diagnostic device built in the computer on the machine side and the second diagnostic device built in the server and multiplexing the system as described above even if the computer arranged on the machine side does not have sufficient throughput. Besides, as the first diagnostic device built in the computer on the machine side extracts the time series data related to the first diagnostic result and outputs it to the second diagnostic device on the server side, communication data volume decreases and communication capacity can be reduced.

It is desirable that the second diagnostic device compares the second diagnostic result with the first diagnostic result and outputs a result of the comparison together with the first diagnostic result and the second diagnostic result.

Besides, it is preferable that the second diagnostic device compares the second diagnostic result with the first diagnostic result and updates the diagnostic information of the first diagnostic device based upon a result of the comparison.

Further, it is preferable that the second diagnostic device displays the first diagnostic result and the second diagnostic result on a display. In that case, the first diagnostic result, the second diagnostic result and the result of the comparison and/or information related to the update of the diagnostic information are displayed on the display.

As described above, when the result of comparing the second diagnostic result with the first diagnostic result is output in addition to the first and second diagnostic results and the result of the comparison and/or the information related to the update of the diagnostic information are/is displayed on the display, the verification by a person of the diagnostic results and a state of the update of the diagnostic information is enabled. Besides, when the first diagnostic result and the second diagnostic result are not coincident as a result of the comparison between both, a cause of abnormality is estimated using the first diagnostic result for reference information, the necessity or the time of maintenance and repair and further, preventive maintenance measures can be examined, and reliable maintenance management and preventive maintenance can be performed. Further, diagnostic precision can be further enhanced by monitoring the temporal transition of the first diagnostic result and the second diagnostic result, enabling judging whether diagnostic algorithm used by the first and second diagnostic devices is proper for diagnosis or not, improving the diagnostic algorithm itself when it is not proper and enabling making more proper diagnosis.

Moreover, as the diagnostic information of the first diagnostic device is automatically updated because the second diagnostic device updates the diagnostic information of the first diagnostic device based upon the result of the comparison of the second diagnostic result and the first diagnostic result, diagnostic precision can be also enhanced in this way.

Advantageous Effects of Invention

According to the present invention, diagnostic precision is enhanced even if the computer arranged on the machine side does not have sufficient throughput in diagnosing a condition of the equipment based upon time series data generated by the sensor attached to the machine or the equipment and contribution to the preventive maintenance of the equipment is enabled. Besides, communication data volume decreases and communication capacity can be reduced.

DESCRIPTION OF EMBODIMENTS

First Embodiment

A first embodiment of the present invention will be described using FIGS. 1 to 5 below.

Figure 1:
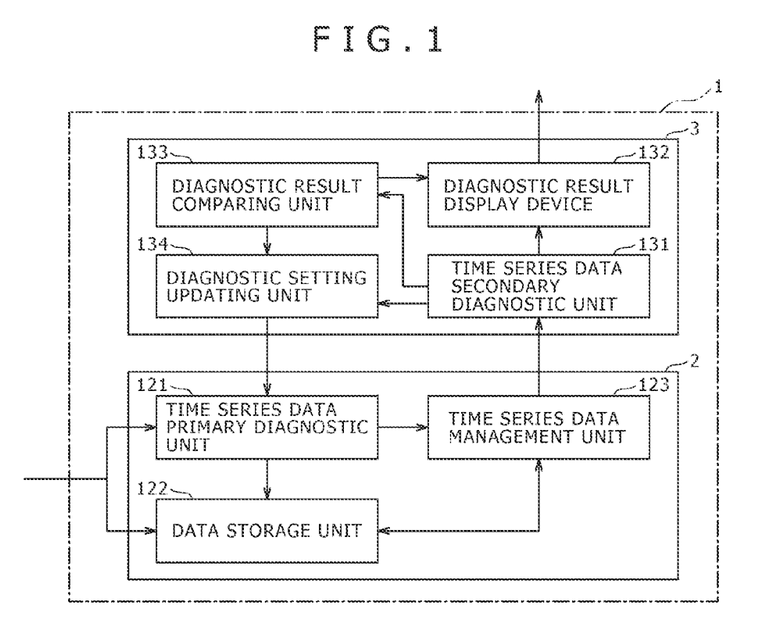
FIG. 1 shows the configuration of an abnormality diagnostic system according to the present invention.

FIG. 1 shows the configuration of an abnormality diagnosis system according to the present invention. The abnormality diagnosis system 1 is configured by a diagnosis device on the machine side 2 (a first diagnosis device) built in a computer on the machine side and a diagnosis device on the server side 3 (a second diagnosis device) built in a server. The diagnosis device on the machine side 2 is configured by a time series data primary diagnostic unit 121 (a first time series data diagnostic unit), a data storage unit 122 and a time series data management unit 123. The diagnostic device on the server side 3 is configured by a time series data secondary diagnostic unit 131 (a second time series data diagnostic unit), a diagnostic result display device 132, a diagnostic result comparing unit 133 and a diagnostic setting updating unit 134.

Figure 2:
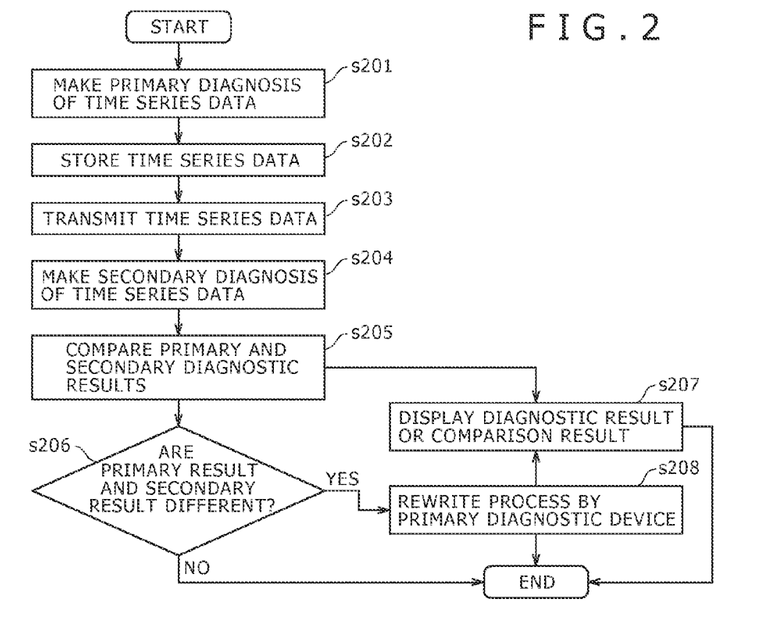
FIG. 2 is a flowchart showing functions and the operation of a diagnostic device on the equipment side and a diagnostic device on the server side.

FIG. 2 is a flowchart showing functions and the operation of the diagnostic device on the machine side 2 and the diagnostic device on the server side 3.

Time series data such as a signal of a sensor output from equipment is input to the diagnostic device on the machine side 2 and the input time series data is input to the time series data primary diagnostic unit 121 and the data storage unit 122. The time series data primary diagnostic unit 121 diagnoses the received time series data and determines whether a condition of the equipment is normal or not. The determined result is output to the data storage unit 122 and the time series data management unit 123 as a primary diagnostic result (a first diagnostic result) (step s201). The data storage unit 122 stores the time series data received from the equipment and the primary diagnostic result received from the time series data primary diagnostic unit 121 (step s202). At this time, the data storage unit 122 may also store the whole of the time series data and the primary diagnostic result respectively received by itself, however, it is desirable that the data storage unit stores only data corresponding to data read by the time series data management unit 123 after the whole data is temporarily stored. The time series data management unit 123 reads the time series data related to the primary diagnostic result held in the data storage unit 122 when the primary diagnostic result received from the time series data primary diagnostic unit 121 shows the abnormality of the equipment and outputs the time series data to the diagnostic device on the server side 3 together with the primary diagnostic result (step s203).

In the diagnostic device on the server side 3, the time series data secondary diagnostic unit 131 receives the primary diagnostic result received from the diagnostic device on the machine side 2 and the time series data related to it, diagnoses the received time series data, and determines whether the condition of the equipment is normal or not (step s204). The determined result is output to the diagnostic result display device 132 and the diagnostic result comparing unit 133 as a secondary diagnostic result (a second diagnostic result) together with the primary diagnostic result. The diagnostic result comparing unit 133 compares the primary diagnostic result and the secondary diagnostic result respectively received (step s205) and outputs a result of the comparison to the diagnostic result display device 132 (step s207). When the result of the comparison is different between the primary diagnostic result and the secondary diagnostic result (step s206), the diagnostic result comparing unit 133 outputs diagnostic setting change instruction information to the diagnostic setting updating unit 134 and the diagnostic setting updating unit 134 outputs the diagnostic setting change instruction information to the time series data primary diagnostic unit 121. When the time series data primary diagnostic unit 121 receives the diagnostic setting change instruction information, it changes setting information of the time series data primary diagnostic unit 121 (step s208). The diagnostic result comparing unit 133 also outputs the diagnostic setting change instruction information to the diagnostic result display device 132. The diagnostic result display device 132 displays the secondary diagnostic result (the second diagnostic result) together with the primary diagnostic result (the first diagnostic result). Besides, the diagnostic result display device 132 displays the result of the comparison between the primary diagnostic result and the secondary diagnostic result and the diagnostic setting change instruction information together.

The functions and the operation of the diagnostic device on the machine side 2 and the diagnostic device on the server side 3 will be described using digitized time series data further in detail referring to FIGS. 3 to 6 below.

Figure 3:
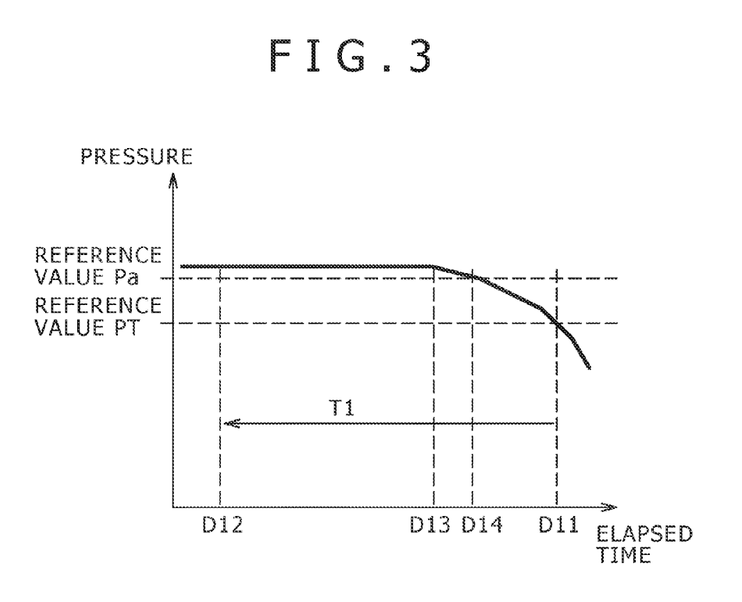
FIG. 3 shows time series data of values of a pressure sensor which is data acquired by digitizing signals received from the sensor attached to equipment to be diagnosed in an abnormality diagnostic system in a first embodiment.

FIG. 3 shows time series data of values of the pressure sensor which is data acquired by digitizing signals received from the sensor attached to the equipment (not shown) to be diagnosed in the abnormality diagnostic system 1. FIG. 3 shows a state in which pressure varies according to the elapse of time. FIG. 3 shows a situation in which an abnormality occurs in the equipment in the vicinity of time D13 and the value of the pressure sensor gradually falls because of the abnormality. In the diagnostic device on the machine side 2, the time series data primary diagnostic unit 121 inputs time series data showing values of the pressure sensor and executes a diagnostic process. During the diagnostic process, the abnormality of the equipment is notified the time series data management unit 123 at the time of time D11. The time series data management unit 123 reads time series data back by preset time length T1 with the time D11 as a starting point, that is, time series data showing values of the pressure sensor from time D12 to the time D11 from the data storage unit 122 as time series data related to the primary diagnostic result, and transmits the time series data together with the diagnostic result (a result of determination as abnormal and abnormality occurrence time) received from the time series data primary diagnostic unit 121 to the diagnostic device on the server side 3.

Figure 4:
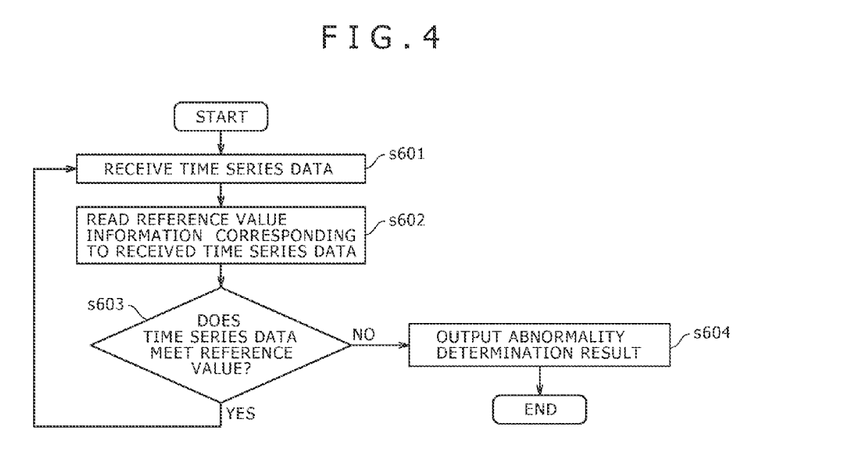
FIG. 4 is a flowchart showing a diagnostic process executed by a time series data primary diagnostic unit.

The above-mentioned diagnostic process in the time series data primary diagnostic unit 121 is executed in a flow shown in FIG. 4. First, the time series data primary diagnostic unit 121 inputs time series data showing values of the pressure sensor (step s601) and reads reference value information corresponding to the input time series data in reference value information held in the time series data primary diagnostic unit 121 beforehand (step s602). In this case, the time series data primary diagnostic unit reads a reference value PT corresponding to the value of the pressure sensor. The time series data primary diagnostic unit 121 compares the input time series data showing values of the pressure sensor and the reference value PT and determines whether the time series data is equal to or exceeds the reference value PT or not (step s603). In this embodiment, it is regarded as a normal condition that the time series data is equal to or exceeds the reference value, however, depending upon a signal of the sensor, the reference value is different and in addition, a normal range is also different. When the input time series data showing values of the pressure sensor is not below the reference value PT, the time series data primary diagnostic unit determines the equipment as normal, processing is returned to the step s601, and the processing is continued. When the input time series data showing values of the pressure sensor is below the reference value PT, the time series data primary diagnostic unit determines the condition of the equipment as abnormal and outputs a result of the determination as abnormal and abnormality occurrence time (in this case, the time D11) to the time series data management unit 123 as a primary diagnostic result (step s604).

Next, the diagnostic device on the server side 3 receives the primary diagnostic result and the time series data respectively transmitted from the diagnostic device on the machine side 2 and makes diagnosis using the time series data which the time series data secondary diagnostic unit 131 receives.

A result of the diagnosis by the time series data secondary diagnostic unit 131 (hereinafter called as a secondary diagnostic result) is output to the diagnostic result display device 132 and the diagnostic result comparing unit 133 together with the primary diagnostic result transmitted from the diagnostic device on the machine side 2.

Figure 5:
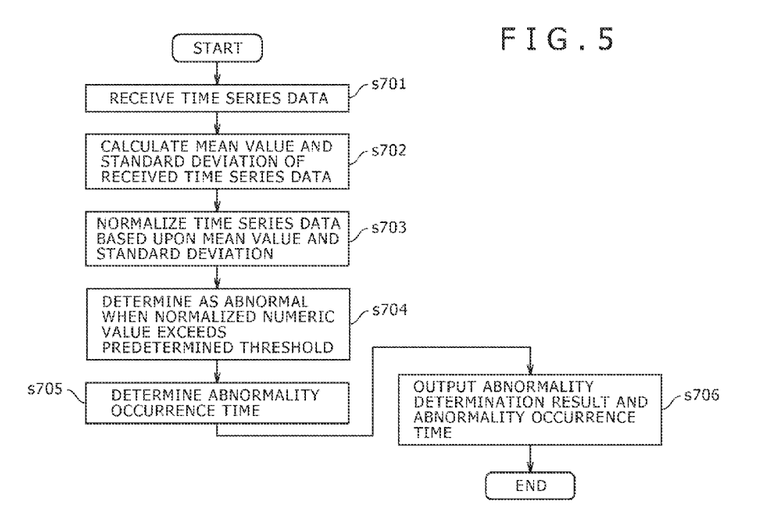
FIG. 5 is a flowchart showing a diagnostic process executed by a time series data secondary diagnostic unit.
Figure 6:
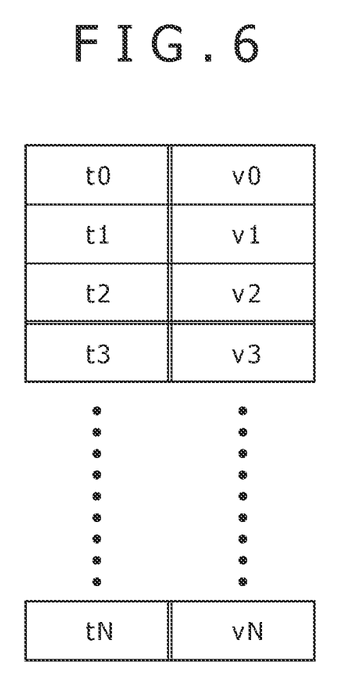
FIG. 6 shows time series data together with each time.

A diagnostic process executed by the time series data secondary diagnostic unit 131 is executed in a flow shown in FIG. 5. The time series data secondary diagnostic unit 131 receives time series data from the time series data management unit 123 (step s701) and calculates a mean value μ and standard deviation σ respectively of the input time series data (step s702). Next, when the time series data is data shown in FIG. 6 (an interval between each time t0 to tN is equal), the time series data secondary diagnostic unit 131 calculates a normalized value Ui (i=0 to N) of a data value v0 to vN of each time using the mean value μ and the standard deviation σ (in an expression 1) (step s703).

$$U_i = \frac{v_i - \mu}{\sigma},$$
$$i = 0 \text{ to } N$$

[Mathematical expression 1]

Next, time series data Ui (i=0 to N) which includes the normalized value of each time and a value of which exceeds ±3 is determined as abnormal (step s704) and hereby, abnormality occurrence time is determined. A method of regarding a point of time at which time series data showing normalized values and exceeding ±3 continuously emerges and a frequency of continuation reaches a reference frequency as abnormality occurrence time and others are used for the determination of abnormality occurrence time. Suppose that a result of the determination as abnormal is acquired by the above-mentioned method and abnormality occurrence time is determined as D14 as shown in FIG. 3. The time series data secondary diagnostic unit 131 outputs the abnormality determination result and the abnormality occurrence time D14 to the diagnostic result display device 132 and the diagnostic result comparing unit 133 as a secondary diagnostic result together with the primary diagnostic result received from the time series data management unit 123.

Next, the diagnostic result comparing unit 133 compares the primary diagnostic result and the secondary diagnostic result respectively received from the time series data secondary diagnostic unit 131 and determines whether the abnormality determination results are coincident or not and whether the abnormality occurrence time is coincident or not. The coincidence of the abnormality occurrence time is determined depending upon whether difference in occurrence time is within a predetermined period or not. The diagnostic result comparing unit 133 outputs a result of the comparison to the diagnostic result display device 132.

When the primary diagnostic result and the secondary diagnostic result are compared and they are different, the diagnostic result comparing unit 133 reads the time series data from the time D12 to the time D14 from the time series data secondary diagnostic unit 131, calculates a lower limit value of the data as a new reference value Pa, outputs this to the diagnostic setting updating unit 134 as diagnostic setting change instruction information, and the diagnostic setting updating unit 134 transmits the diagnostic setting change instruction information to the time series data primary diagnostic unit 121. The time series data primary diagnostic unit 121 sets the reference value Pa included in the received diagnostic setting change instruction information as a new reference value. When the reference value is changed, the time series data primary diagnostic unit 121 executes a diagnostic procedure of the diagnostic device on the machine side 2 and the diagnostic procedure may be also repeated until the primary diagnostic result and the secondary diagnostic result are coincident in a process executed in the diagnostic result comparing unit 133 of the diagnostic device on the server side 3 for comparing the primary and secondary diagnostic results. Besides, the diagnostic result comparing unit 133 outputs the diagnostic setting change instruction information to the diagnostic result display device 132.

The diagnostic result display device 132 displays each information output by the time series data secondary diagnostic unit 131 and the diagnostic result comparing unit 133 on a monitor (not shown) and presents each information to a user, for example, a manager (not shown).

Figure 9:
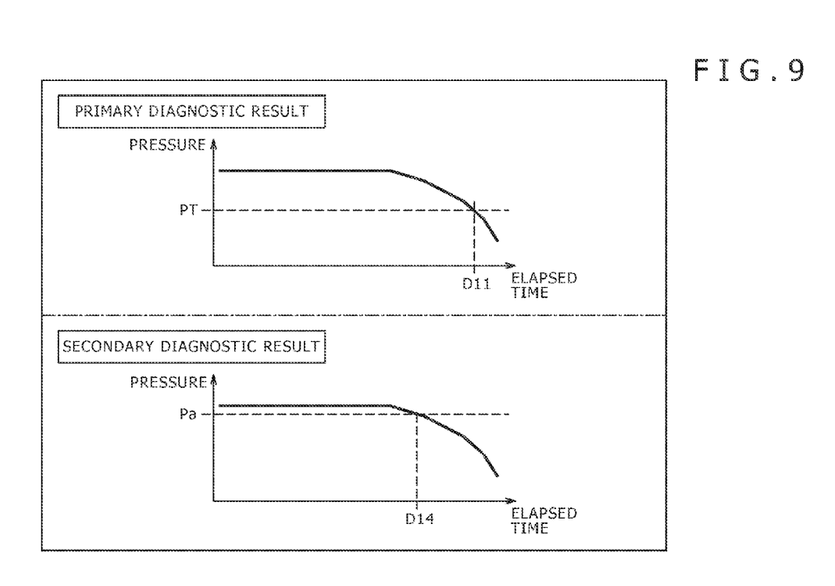
FIG. 9 shows an example of the display of a primary diagnostic result (a first diagnostic result) and a secondary diagnostic result (a second diagnostic result) which the time series data secondary diagnostic unit respectively outputs.
Figure 10:
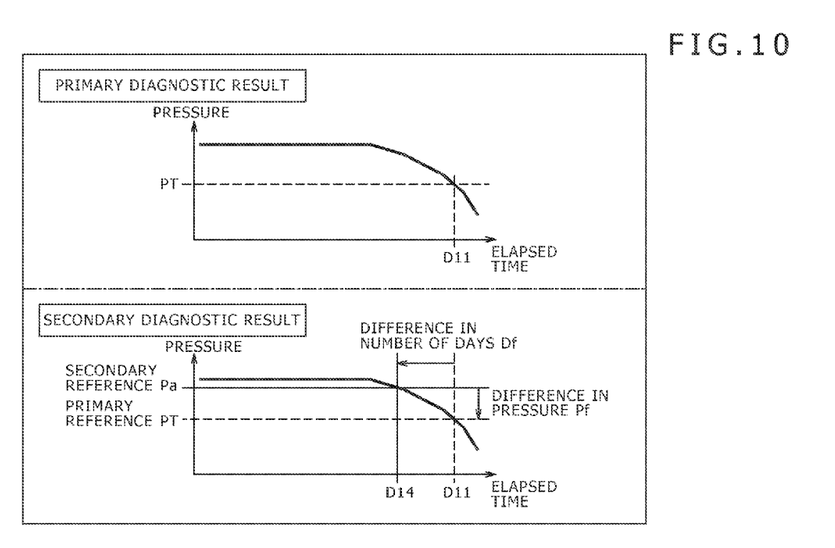
FIG. 10 shows an example of the display of a result output by a diagnostic result comparing unit of the comparison between the primary diagnostic result and the secondary diagnostic result.
Figure 11:
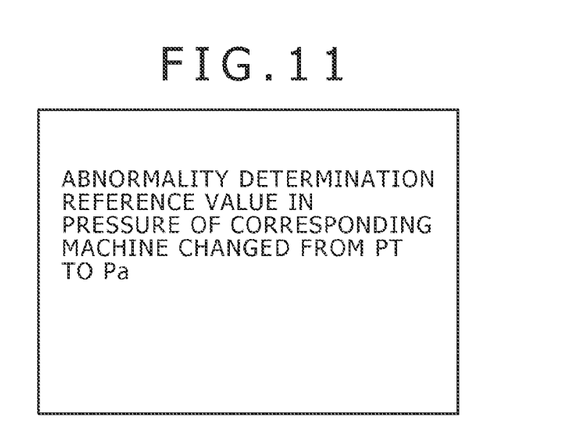
FIG. 11 shows an example of the display of diagnostic setting change instruction information output by the diagnostic result comparing unit.

FIG. 9 shows an example of the display of the primary diagnostic result (the first diagnostic result) and the secondary diagnostic result (the second diagnostic result) respectively output by the time series data secondary diagnostic unit 131. In the example of the display shown in FIG. 9, the diagnostic result display device 132 displays the secondary diagnostic result together with the primary diagnostic result. FIG. 10 shows an example of the display of a result of comparison between the primary diagnostic result and the secondary diagnostic result respectively output by the diagnostic result comparing unit 133. In the example of the display shown in FIG. 10, the diagnostic result display device 132 displays difference in pressure between the reference values for determination and difference in the number of days between abnormality detection dates as the information of comparison between the primary diagnostic result and the secondary diagnostic result. FIG. 11 shows an example of the display of diagnostic setting change instruction information output by the diagnostic result comparing unit 133. In the example of the display shown in FIG. 11, the diagnostic result display device 132 displays that the reference value for determining a value of the sensor is changed from PT to Pa. It is desirable that the diagnostic setting change instruction information is displayed together with the result of comparing the primary diagnostic result and the secondary diagnostic result shown in FIG. 10.

Figure 12:
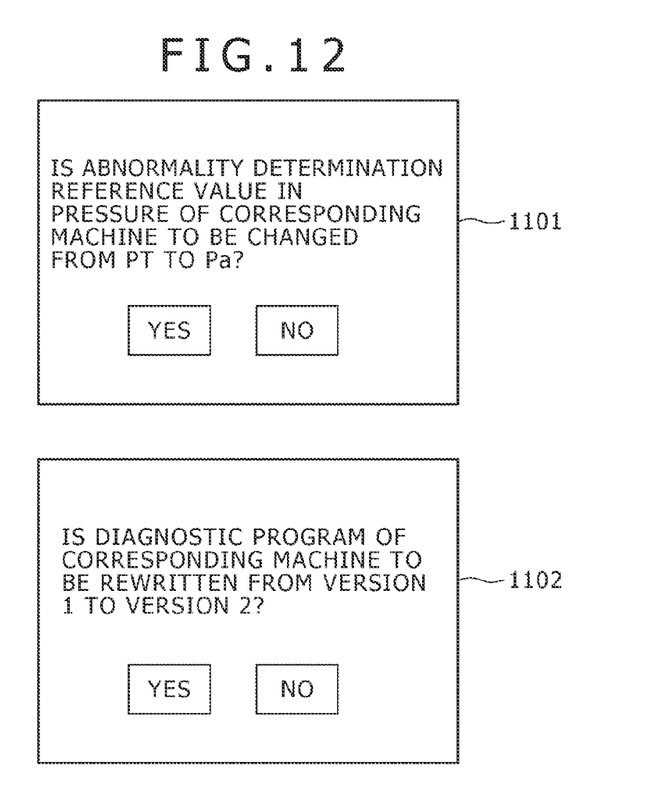
FIG. 12 shows an example of display when a manager instructs to allow a change of the diagnostic process, shows an example of display requesting to allow a change of a reference value for determination on the upside, and shows an example of display requesting to allow rewriting the whole diagnostic program on the downside.

FIG. 12 shows an example of display when the manager instructs to allow a change of the diagnostic process, a screen 1101 shows an example of display for allowing a change of the reference value for determination, and a screen 1102 shows an example of display for allowing rewriting the whole diagnostic program. When the diagnostic result comparing unit 133 outputs diagnostic setting change instruction information via the diagnostic setting updating unit 134, the manager can verify a change of setting by displaying the screen 1101 before the output and the reliability of setting update is enhanced. As described later, the whole diagnostic program may be also rewritten, in that case, the manager can also verify a change of the diagnostic program by displaying the screen 1102 before the output, and the reliability of the update of the diagnostic program is enhanced.

According to this embodiment, as the abnormality diagnostic system 1 is configured by the diagnostic device on the machine side 2 and the diagnostic device on the server side 3 and is multiplexed, diagnostic precision can be enhanced even if the computer arranged on the machine side does not have sufficient throughput. Besides, as the diagnostic device on the machine side 2 extracts time series data related to the first diagnostic result and outputs it to the diagnostic device on the server side 3, communication data volume decreases and communication capacity can be reduced.

Moreover, as a result of comparing the primary diagnostic result and the secondary diagnostic result in addition to them are displayed on the diagnostic result display device 132 and further, the update information of diagnostic setting information is displayed there, the verification by a person of the diagnostic results and an updated state of diagnostic information is enabled. When the primary diagnostic result and the secondary diagnostic result are not coincident as a result of comparing them, a cause of abnormality is estimated by using the primary diagnostic result for reference information, the necessity or the timing of maintenance and repair and further, preventive maintenance measures can be examined, and reliable maintenance management and reliable preventive maintenance can be performed. Further, the diagnostic precision can be further enhanced by monitoring the temporal transition of the primary diagnostic result and the secondary diagnostic result, enabling judging whether diagnostic algorithm used by the time series data primary diagnostic unit 121 and the time series data secondary diagnostic unit 131 is proper for diagnosis or not, improving the algorithm itself when the diagnostic algorithm is not proper and enabling making more proper diagnosis (refer to a second embodiment).

Furthermore, as the diagnostic setting information of the time series data primary diagnostic unit 121 can be automatically updated when the time series data secondary diagnostic unit 131 updates the diagnostic setting information of the time series data primary diagnostic unit 121 based upon a result of comparison between the primary diagnostic result and the secondary diagnostic result, the diagnostic precision can be also enhanced in this way.

Second Embodiment

A second embodiment of the present invention will be described using FIGS. 7, 1, 2 and 4 below. As configuration, a function and operation of the abnormality diagnostic system 1 according to the present invention and shown in FIGS. 1 and 2 are the same as the contents in the first embodiment, the description of them is omitted.

Figure 7:
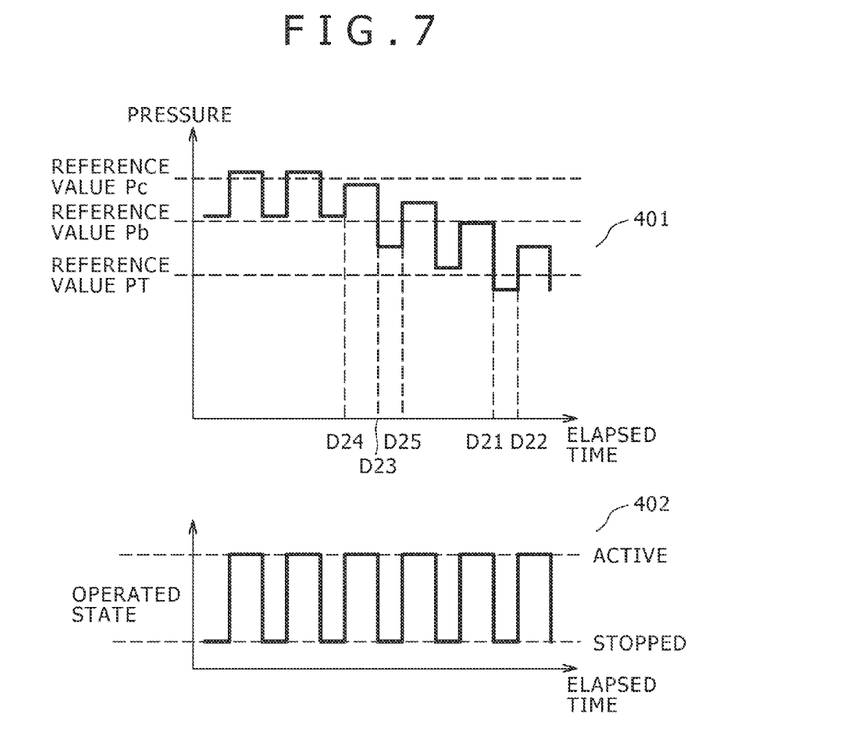
FIG. 7 shows time series data of values of a pressure sensor and time series data of signals showing an active state of equipment which are data acquired by digitizing the signals received from sensors attached to the equipment to be diagnosed in an abnormality diagnostic system in a second embodiment.

The details of the function and the operation in this embodiment will be described below. FIG. 7 shows time series data 401 of values of a pressure sensor and time series data 402 of signals showing an active state of equipment, which are data acquired by digitizing signals which an abnormality diagnostic system 1 receives from a sensor attached to the equipment (not shown) to be diagnosed. FIG. 7 shows a situation in which the values of the pressure sensor also vary according to activation and a stop, repeating the activation and the stop according to the elapse of time. In this embodiment, a situation in which an abnormality occurs in the equipment in the vicinity of time D24 and values of the pressure sensor gradually fall because of the abnormality is described. In a diagnostic device on the machine side 2, a time series data primary diagnostic unit 121 receives time series data showing values of the pressure sensor and executes a diagnostic process. At time D21 at which the time series data showing the values of the pressure sensor is below a reference value PT during the diagnostic process, the abnormality of the equipment is notified a time series data management unit 123. However, afterward, at time D22 at which the time series data showing the values of the pressure sensor exceeds the reference value PT, the normality of the equipment is notified the time series data management unit 123.

The above-mentioned diagnostic process in the time series data primary diagnostic unit 121 is executed in the flow shown in FIG. 4 as in the first embodiment. First, the time series data primary diagnostic unit 121 inputs time series data showing values of the pressure sensor (the step s601) and reads reference value information corresponding to the input time series data in reference value information held in the time series data primary diagnostic unit 121 beforehand (the step s602). In this case, the reference value PT corresponding to the value of the pressure sensor is read. The time series data primary diagnostic unit 121 compares the input time series data showing the values of the pressure sensor and the reference value PT and determines whether the time series data is equal to or exceeds the reference value PT or not (the step s603). In this embodiment, it is regarded as a normal condition that the time series data is equal to or exceeds the reference value, however, depending upon a signal of the sensor, the reference value is different and in addition, a normal range is also different. When the input time series data showing the values of the pressure sensor is not below the reference value PT, a condition of the equipment is determined as normal, processing is returned to the step s601, and the processing is continued. When the input time series data showing the values of the pressure sensor is below the reference value PT, a condition of the equipment is determined as abnormal, and an abnormality determination result and abnormality occurrence time (in this case, the time D21) are output to the time series data management unit 123 as a primary diagnostic result (the step s604).

However, as described above, when time reaches D22, the determination as abnormal converts to the determination as normal. As abnormality once detected converts to normality depending upon timing at which the diagnostic device on the machine side 2 notifies a diagnostic device on the server side 3, a situation in which a diagnostic result that an abnormality occurs is not notified the diagnostic device on the server side 3 may occur as a result. Or a situation in which abnormality and normality are repeatedly notified although an abnormality actually continues may occur. As it is also at the time D24 that an abnormality actually occurs when the diagnostic device on the machine side 2 notifies the diagnostic device on the server side 3 that the equipment is abnormal, it is known that time at which the abnormality is detected rather lags. This reason is that as activation and a stop are also repeated in an operated period in a normal condition (in this case, a period till the time D24) and a value of pressure varies according to an active state and a stopped state, a reference value for detecting the abnormal fall of a pressure value is based upon a pressure value in the stop. Therefore, difference with an actual pressure value in activation increases and the detection of fall is retarded. If the reference value is based upon a value in activation, the fall of pressure in the stop may be detected by mistake.

In such a case as the case in this embodiment, normality and abnormality cannot be also correctly detected by a diagnostic process using normalizing processing of time series data which a time series data secondary diagnostic unit 131 of the diagnostic device on the server side 3 executes as in the first embodiment. In the diagnostic process using the normalizing processing, as a reference value is set to Pb, abnormality can be detected at time D23, however, at time D25, the abnormality is determined as a normal condition again by mistake, and although the abnormality continues, the abnormality is not correctly determined.

A manager on the server side can grasp the above-mentioned diagnostic situation based upon information displayed on a diagnostic result display device 132.

Then, the manager on the server side rewrites the diagnostic process (a diagnostic program or diagnostic algorithm) by the time series data primary diagnostic unit 121 of the diagnostic device on the machine side 2 and the time series data secondary diagnostic unit 131 of the diagnostic device on the server side 3 so that the abnormal fall of a pressure value is detected after the time series data secondary diagnostic unit 131 of the diagnostic device on the server side 3 is improved and both the signal 401 showing the pressure value and the signal 402 showing an active state are added. Concretely, in a diagnostic process by the time series data primary diagnostic unit 121, the time series data 402 of signals showing an active state of the equipment is input in addition to the time series data 401 showing values of the pressure sensor, and the manager on the server side rewrites the diagnostic process so that determination is made using the reference value Pb in a stopped state and using a reference value Pc in the active state. The above-mentioned abnormality is ordinarily correctly determined as abnormality since the time D24 by changing as described above. At this time, the time series data management unit 123 of the diagnostic device on the machine side 2 outputs the time series data 402 of signals showing the active state of the equipment in addition to the time series data 401 showing values of the pressure sensor to the diagnostic device on the server side 3 together with the primary diagnostic result. Besides, the diagnostic process is rewritten so that in the diagnostic process by the time series data secondary diagnostic unit 131, a normalized value of time series data in the stopped state and a normalized value of that in the active state are separately calculated, it is determined based upon the respective normalized values whether abnormality occurs or not, and when it is determined that abnormality occurs in both states, the equipment is determined as abnormal.

The rewrite of the diagnostic process (the diagnostic algorithm) by the time series data primary diagnostic unit 121 of the diagnostic device on the machine side 2 may be also directly performed in the diagnostic device on the machine side 2, however, in this embodiment, a diagnostic setting updating unit 134 of the diagnostic device on the server side 3 performs the rewrite. In that case, it is not only a new reference value but the information of a new diagnostic process itself that determination is made using plural signals and reference values that the diagnostic setting updating unit 134 transmits to the time series data primary diagnostic unit 121. As not only the new set values but the new diagnostic process can be used because the time series data primary diagnostic unit 121 has means to update itself as described above, diagnostic precision on the equipment side can be further enhanced.

Third Embodiment

Figure 8:
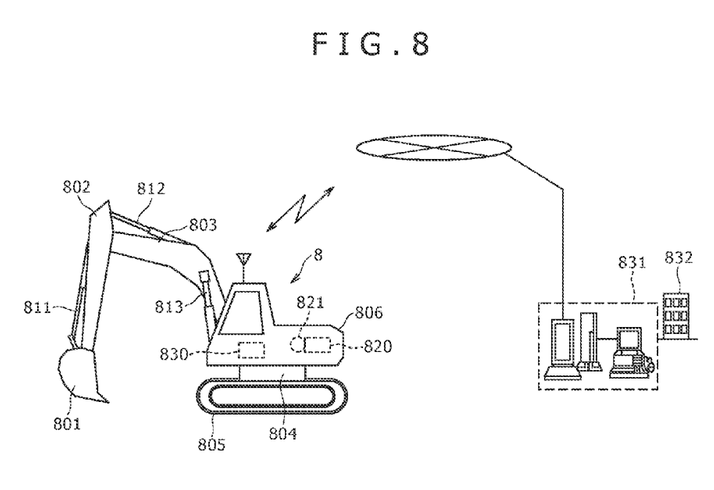
FIG. 8 shows the whole configuration of a large hydraulic shovel which is one example of industrial machinery to which the abnormality diagnostic system according to the present invention is applied and the abnormality diagnostic system.

Next, an example to which the abnormality diagnostic system according to the present invention is applied will be described using FIG. 8. FIG. 8 shows the whole configuration of a large hydraulic shovel that is one example of industrial machinery to which the abnormality diagnostic system according to the present invention is applied and an abnormality diagnostic system.

The large hydraulic shovel 8 can perform operation such as excavation by provided each operating mechanism. A bucket 801, an arm 802 and a boom 803 configure an operating machine and these are driven by hydraulic cylinders 811, 812, 813. Besides, in the hydraulic shovel 8, a revolving superstructure 806, a revolving mechanism 804 that revolves the revolving superstructure 806 and right and left crawlers (crawler belts) 805 (only one side is shown) as a running mechanism of the whole hydraulic shovel are provided. The revolving mechanism 804 is provided with a hydraulic motor for revolving (not shown) and the crawler 805 is respectively provided with a hydraulic motor for running. The revolving superstructure 806 is equipped with two engines 820 (only one is shown) for example and plural main pumps 821 (only one is shown) driven by these engines 820. A hydraulic actuator such as the hydraulic cylinders 811, 812, 813 and the hydraulic motor is driven by oil discharged from the main pump 821.

Moreover, in the hydraulic shovel 8, a vehicle body controller 830 for controlling each operating mechanism, collecting and monitoring information from a sensor is mounted. The vehicle body controller 830 has communication facility and communicates with a server 831. The server 831 is installed in a management office 832 (for example, an office of a maker, a sales shop and a dealer and rental service of the hydraulic shovel 1).

A diagnostic device on the machine side 2 that configures the abnormality diagnostic system 1 according to the present invention is built in the vehicle body controller 830 and a diagnostic device on the server side 3 is built in the server 831. In this embodiment, the abnormality diagnostic system 1 diagnoses the main pump 821 for example, a pressure sensor (not shown) that detects discharge pressure is attached to the respective main pumps 821, and the diagnostic device on the machine side 2 receives signals output by the pressure sensors as time series data. In this case, as the plural main pumps 821 are provided, the diagnostic device on the machine side 2 receives time series data from the sensor every pump and processes every pump. The diagnostic device on the server side 3 also similarly receives the time series data output from the diagnostic device on the machine side 2 every pump and processes every pump.

The abnormality diagnostic system 1 may also diagnose the engine 820 and another equipment.

LIST OF REFERENCE SIGNS

1 Abnormal diagnostic system
2 Diagnostic device on machine side (First diagnostic device)
3 Diagnostic device on server side (Second diagnostic device)
8 Large hydraulic shovel (Industrial machine)
121 Time series data primary diagnostic unit (First time series data diagnostic unit)
122 Data storage unit
123 Time series data management unit
131 Time series data secondary diagnostic device (Second time series data diagnostic device)
132 Diagnostic result display device
133 Diagnostic result comparing unit
134 Diagnostic setting updating unit
820 Engine (Equipment)
821 Main pump (Equipment)
830 Vehicle body controller
831 Server

The invention claimed is:

1. An abnormality diagnostic system that diagnoses a condition of a machine or equipment based upon time series data generated by a sensor attached to the machine or the equipment, comprising:
a first diagnostic device built in a computer on the machine side; and
a second diagnostic device built in a server that communicates with the first diagnostic device, wherein:
the first diagnostic device diagnoses the time series data generated by the sensor, acquires a first diagnostic result, extracts times series data related to the first diagnostic result according to the first diagnostic result, and outputs the time series data related to the first diagnostic result together with the first diagnostic result; and
the second diagnostic device receives the first diagnostic result and the time series data related to the first diagnostic result from the first diagnostic device, diagnoses the time series data to determine a condition of the machine or the equipment, acquires a second diagnostic result, compares the second diagnostic result with the first diagnostic result, and outputs the second diagnostic result together with the first diagnostic result and a result of the comparison, the result of the comparison being indicative of a diagnostic settings change based on the condition of the machine or the equipment.

2. The abnormality diagnostic system according to claim 1, wherein:
the second diagnostic device instructs the display device to display the first and second diagnostic results and the result of comparison.

3. The abnormality diagnostic system according to claim 1, wherein:
the second diagnostic device compares the second diagnostic result with the first diagnostic result and updates diagnostic information of the first diagnostic device based upon a result of the comparison.

4. The abnormality diagnostic system according to claim 3, wherein:
the second diagnostic device instructs the display device to display the first and second diagnostic results and information related to the update of the diagnostic information.

5. The abnormality diagnostic system according to claim 1, wherein:
the second diagnostic device instructs a display device to display the first and second diagnostic results.

6. The abnormality diagnostic system according to claim 1, wherein:
the first diagnostic device comprises:
a first time series data diagnostic unit that diagnoses the time series data generated by the sensor and outputs the first diagnostic result;
a data storage unit that holds the time series data generated by the sensor; and
a time series data management unit that reads time series data related to the first diagnostic result according to the first diagnostic result output by the first time series data diagnostic unit from the data storage unit and outputs the read time series data together with the first diagnostic result.

7. The abnormality diagnostic system according to claim 1 or 6, wherein:
the second diagnostic device comprises:
a second time series data diagnostic unit that receives the first diagnostic result and time series data related to the first diagnostic result from the first diagnostic device, diagnoses the time series data, and outputs the second diagnostic result; and
a diagnostic result display device that displays the second diagnostic result output by the second time series data diagnostic unit together with the first diagnostic result.

8. The abnormality diagnostic system according to claim 7, wherein:
the second diagnostic device is further provided with a diagnostic result comparing unit that compares the second diagnostic result output by the second time series data diagnostic unit with the first diagnostic result; and
the diagnostic result display device displays a result of comparison by the diagnostic result comparing unit together with the first and second diagnostic results.

9. The abnormality diagnostic system according to claim 7, wherein:
the second diagnostic device further comprises:
a diagnostic result comparing unit that compares the second diagnostic result output by the second time series data diagnostic unit with the first diagnostic result; and
a diagnostic setting updating unit that updates information of diagnosis by the first time series data diagnostic unit according to a result of comparison by the diagnostic result comparing unit; and
the diagnostic result display device displays the result of comparison by the diagnostic result comparing unit and information of the update of the diagnostic information by the diagnostic setting updating unit together with the first and second diagnostic results.

10. Industrial machinery, comprising:
the first diagnostic device according to claim 1 or 6, wherein:
the sensor is attached.

* * * * *